Nov. 26, 1957 R. PAILLET 2,814,661
FLAT DRY CELL
Filed Dec. 1, 1953 3 Sheets-Sheet 1
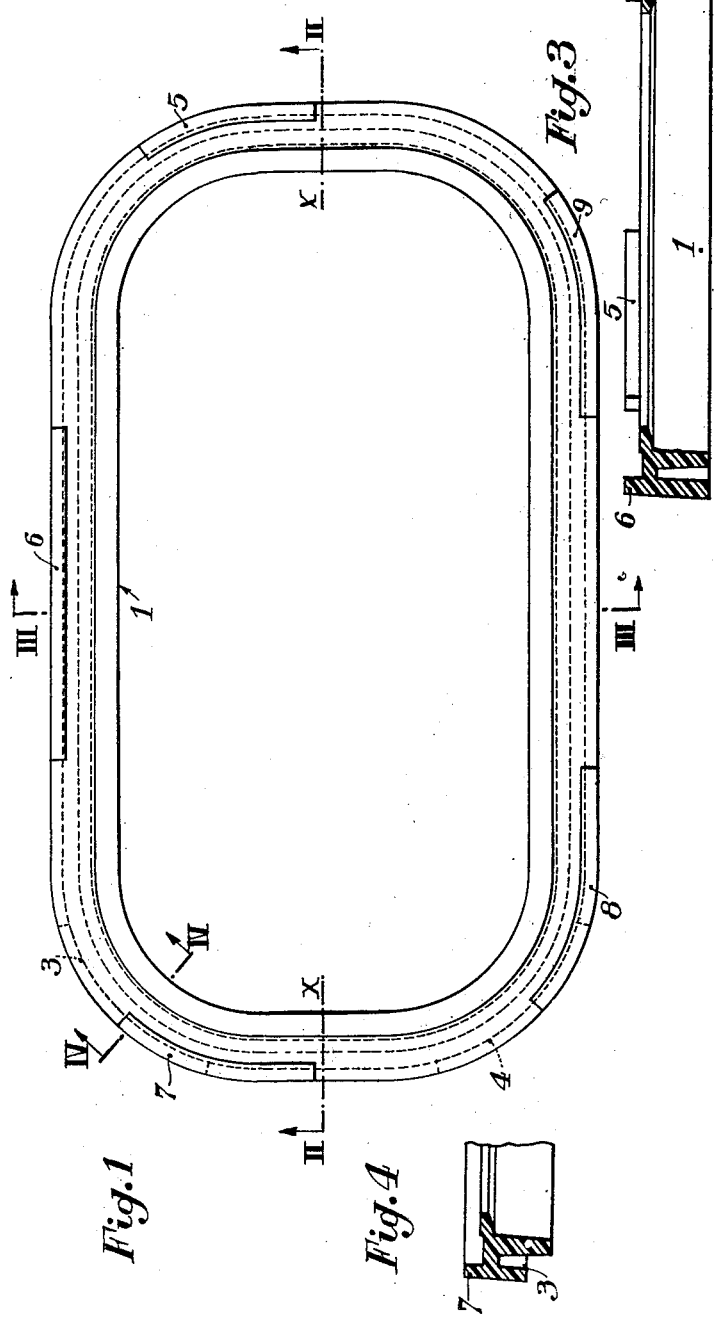

Nov. 26, 1957 R. PAILLET 2,814,661
FLAT DRY CELL
Filed Dec. 1, 1953 3 Sheets-Sheet 2

Nov. 26, 1957  R. PAILLET  2,814,661
FLAT DRY CELL

Filed Dec. 1, 1953  3 Sheets-Sheet 3

United States Patent Office 2,814,661
Patented Nov. 26, 1957

2,814,661

FLAT DRY CELL

Robert Paillet, Paris, France, assignor to Societe Anonyme dite: Societe des Piles Wonder, Saint-Ouen, France Application December 1, 1953, Serial No. 395,540

Claims priority, application France June 5, 1953

3 Claims. (Cl. 136—111)

Dry batteries made of flat elements are usually formed of elements associated in series and the voltage of the cell is thus equal to the product of the unit voltage of each element by the number of associated elements. As against this, the effective life of the battery, equal to that of each one of the flat elements, is necessarily fairly low. In numerous applications, it would be desirable to have available batteries with a fairly low voltage, possibly but offering a long operational life. This result could be obtained by associating the elements in parallel instead of associating them in series. But the dry cell flat elements existing at present do not allow such an assembling.

Some flat elements of a known model are equipped on one face, with a bi-polar electrode formed by a metal blank, generally made of zinc, coated on one face only with a conducting and impervious carbon containing material. This metal blank is an anode on one side for one cell and a cathode on the other side for the next cell. Each one of these cells cannot work independently and due to this fact any coupling in parallel is impossible.

Elements exist, with an individual operation, in which the two opposite faces are covered, one with a metal blank forming an anode and the other one with a sheet of carbonaceous material forming a cathode. For associating in parallel such elements stacked on top of one another, it would be sufficient to connect the metal blanks with a negative terminal and the sheets of carbonaceous material with a positive terminal. Such an assembling however, is practically impossible with the known structures of flat elements of this type.

A first object of the present invention is a flat dry battery element which can be associated in parallel with other elements of the same model.

In the element according to the invention, a frame of plastic material, containing the electrolyte and depolarizer, with its lower portion closed by a zinc cup-shaped element and its upper portion by a sheet of carbonaceous material is provided, on its lower periphery, with notches uncovering part of the side of the cup-shaped element and extended, on its upper periphery, by castellations holding the carbonaceous sheet in position.

The battery according to the invention is obtained by stacking up elements, cup bottom against cup bottom and carbonaceous material sheet against carbonaceous material sheet, with engagement of the castellations of the frame of one of the elements in the intervals between the castellations of the frame of the other element, and interposition, between the two sheets of carbonaceous material, of a metal sheet protruding beyond the frames, between two castellations, by a finger bent at right angle and by connecting the cup-shaped elements with a negative terminal by a wire soldered on the portions of these cup-shaped elements uncovered by the notches in the frame, and the metal blades with a positive terminal through another wire soldered on the fingers of such blades and surrounding the assembly by engagement into a plastic material sheath.

The features of the invention will appear more clearly from the following description with reference to the drawing wherein:

Figures 1, 2, 3, 4 show the plastic material frame, respectively in a top plan view, and in three sections, one of which a partial one, respectively along II—II, III—III and IV—IV of Figure 1.

Figure 5:
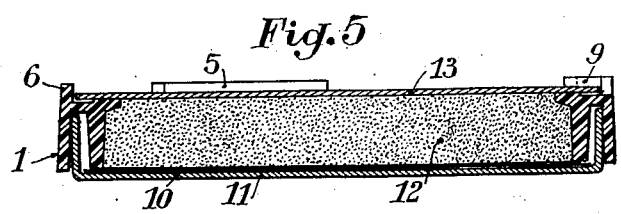
Figure 5 shows, in section, the finished battery element.

The plastic material frame 1, according to Figures 1 to 4, has a general gutter shape extending over a rectangular contour with rounded angles and with two sides of equal heights, extending downwards. On each of two sectors symmetrical with respect to the plane of symmetry of the contour coinciding with the section line II—II in Fig. 1 and perpendicular to the paper, the lower rim of the outer side is provided with a notch 3 or 4. The periphery of the upper section of this frame 1 is extended, upwards, by spaced castellations 5 to 9. The castellations 5 to 9 and the spaces between them are so arranged that there is a corresponding space directly opposite each castellation with respect to the line of symmetry II—II. Thus, for example, the space between castellations 8 and 9 is symmetrically opposite castellation 6. Each of the castellations has a peripheral length only a little less than that of the symmetrically opposite space with the exception of castellation 5 which—at the end farthest from the line of symmetry—is substantially shorter than the space between the castellations 5 and 9.

The assembling of the battery element in the frame 1 is effected as indicated in Figure 5 in a manner similar to that indicated in the previous U. S. Patent No. 2,663,-750 to Robert Pailet.

A zinc cup-shaped element 10, forming the negative element terminal, is nested by the outer face of its side into the inner face of the outer side of the frame 1. This outer face of the side of the cup-shaped element 10 is thus protected by the frame, except in the two portions which are symmetrical with respect to the longitudinal plane of symmetry coinciding with the line II—II in Figure 1, and which are uncovered by the notches 3 and 4. On the bottom of the cup-shaped element 10 is laid the electrolytic paper 11, above which the inner side of the frame 1 is filled with depolarizer 12 up to the level of the upper section of this frame. On this upper section and on the surface of the depolarizer 12 is laid a sheet of carbonaceous material 13 held in position by the castellations 5 to 9.

Figure 6:
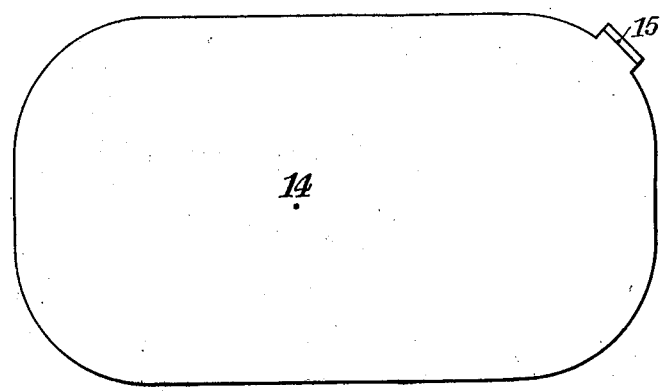
Figures 6 and 7 show, respectively, by a plan view and by an elevation, the metal sheet to be interposed between two sheets of carbonaceous material of two superposed elements.
Figure 7:
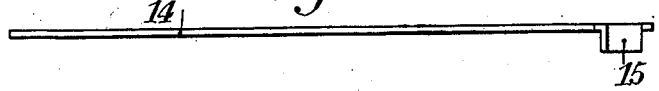

The assembling of the elements thus obtained into a battery requires, according to the invention, the use, for each pair of elements, of a thin metal blade, preferably made of hardened brass. As shown in Figures 6 and 7, this blade 14 is plane, with a contour inscribable, with small clearance in the inner contour of the castellations 5 to 9 and it carries, at one of the rounded angles of its contour, a finger-shaped extension 15, bent at right angle with a width slightly less than the interval between the section of the castellation 5 most remote from the plane of symmetry and the plane element symmetrical of the section of the castellation 9 closest to this plane of symmetry.

Figure 8:
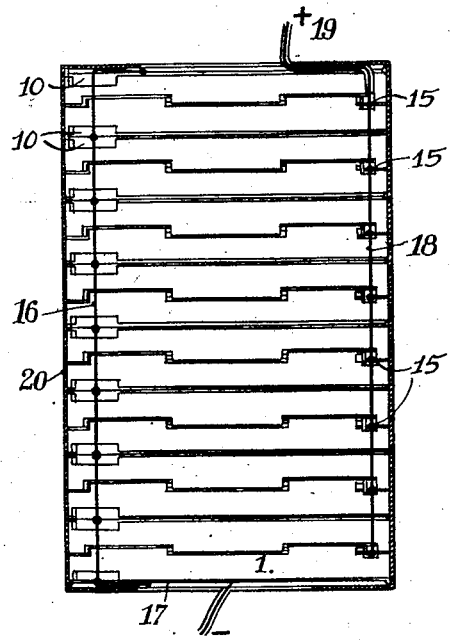
Figure 8 is an elevation of the finished battery with the sheath in section to show the assembling of the elements.

For assembling the battery represented in Figure 8, there are formed a number of pairs of elements by nesting two elements against each other by their upper faces, with interposition between the two sheets of carbonaceous material 13, of a blade 14, the finger 15 of which passing between the castellation 5 or 9 of the frame 1 of one element and the castellation 9 or 5 of the frame 1 of the other element folds down along the outer face of the outer side of one of said frames. These pairs of elements are then stacked up on top of one another, cup bottom 10 against cup bottom 10, the uncovered portions of the two cup-shaped elements in contact as well as the fingers 15 being then arranged above one another. A wire 16, soldered to these uncovered portions of the cup-shaped elements 10 in contact and to the extreme cup-shaped elements 10 is connected to a metal plate 17 attached under the cup-shaped element 1 of the lower element and forming the negative terminal of the battery. Another wire 18, soldered to the fingers 15 reaches, on the upper element, a positive terminal 19 for the battery. The assembly is advantageously strengthened and made tight by engagement into a plastic sheath 20 as was indicated in U. S. Patent No. 2,671,125 to André Heraud.

Figure 9:
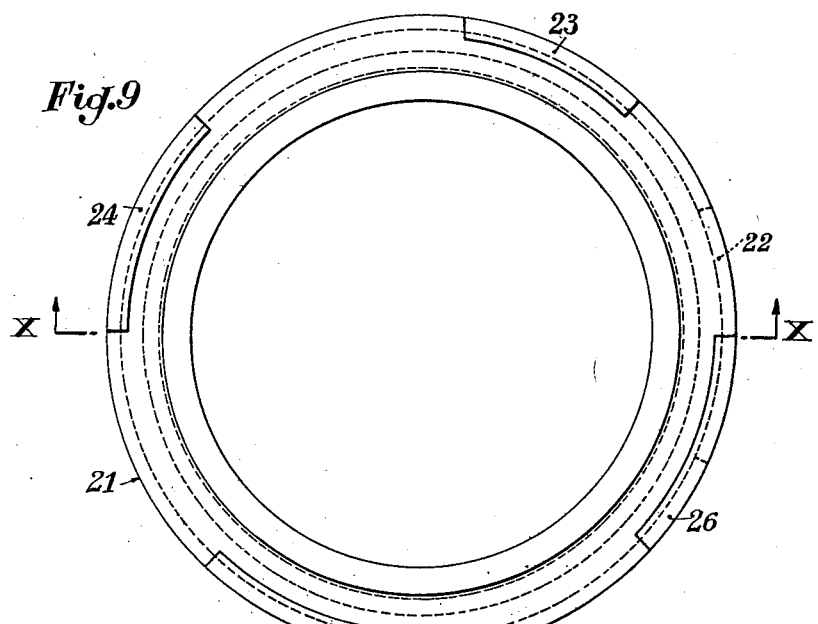
Figures 9 and 10 show a modified embodiment of the plastic material frame, respectively by a plan view from above, and by a section along X—X in figure 9.
Figure 10:
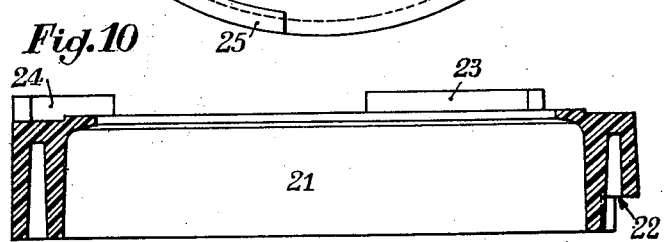
Figure 11:
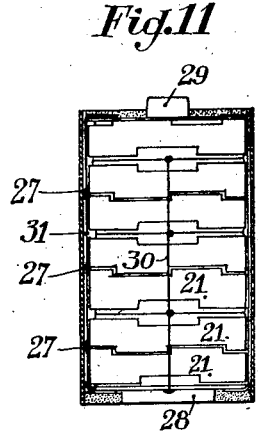
Figure 11 is an elevation of a battery built with elements housed in frames according to Figures 9 and 10 with the sheath in section to show the assembling of these elements.

The contour of the plastic material frame and consequently the section of the element and of the battery itself, instead of being rectangular with rounded angles, as per Figure 1, may have any other shape. By way of example, the frame 21 of Figures 9 and 10 offers a circular contour. In this frame 21, the lower rim of the outer side is provided with a single notch 22. The periphery of the upper edge is extended upwards by four castellations 23 to 26, the castellations 24 and 26 of one frame being capable to fit with a very small clearance between the castellations 26 and 23 respectively or 24 and 25 of another frame. On the other hand, the two castellations 23 and 25 of one of these frames fitting against each other are separated from the adjacent castellations 25 and 23 respectively of the other frame, at two diametrically opposite points, by an interval which may afford a passage at one of these two points to the finger 27 of a circular metal blade playing the part of the blade 14 in the form of embodiment described previously. Figure 11 shows a battery of circular section formed of seven elements housed in frames of model 21 in Figures 9 and 10, in which the negative terminal is formed of a metal cap 28 placed under the bottom of the cup of the lower element of the positive terminal by another metal hat 29 covering the sheet of carbonaceous material of the upper element. A wire 30 connects the cap 28 with the portions of the cups in contact which are uncovered by the notches 22 of the frames 21 and another wire 31 connects the cap 29 with the fingers 27 protruding between two faces nested into each other of two superposed elements.

What I claim is:

1. A flat element to be associated in parallel with identical elements for forming a dry battery with a long operational life, comprising a zinc cup having a bottom and a periphery limited by an upwardly projecting rim, a frame of plastic material, engaged around the periphery of the cup, said frame having a lower rim provided with a notch, uncovering a portion of the periphery of the cup, a plane upper rim, parallel with the bottom of the cup and covering the upper rim of the periphery of the cup and peripheral extensions of equal length rising from and forming castellations around the plane upper rim, said castellations being separated from one another by intervals of the same length and by at least one interval of greater length, a paper impregnated with an electrolytic liquid and laid on the bottom of the cup, a depolarizer placed on the electrolytic paper up to the level of the plane upper rim of the frame and a sheet of carbonaceous material covering the surface of the depolarizer and seated on the plane upper rim of the frame, said sheet extending peripherally out to the castellations.

2. A group to be associated in parallel with identical groups for forming a dry battery with a long operational life, formed by a flat element comprising a zinc cup with a bottom and a periphery limited by an upwardly projecting rim, a frame of plastic material, engaged around the periphery of the cup, said frame having a lower rim provided with a notch uncovering a portion of the periphery of the cup, a plane upper rim, parallel with the bottom of the cup and covering the upper rim of the periphery of the cup and peripheral extensions of equal lengths rising and forming castellations around the plane upper rim, said castellations being separated from one another by intervals of the same length and by at least one interval of greater length, a paper impregnated with an electrolytic liquid and placed on the bottom of the cup, a depolarizer placed on the electrolytic paper up to the level of the plane upper rim of the frame and a sheet of carbonaceous material covering the surface of the depolarizer and protruding peripherally from this surface and extending on the plane upper rim of the frame, up to the castellations, a metal blade covering the sheet of carbonaceous material of this element and having a finger extending slightly outside the upper rim of the frame, covering partially the larger interval between two castellations, against one castellation, and leaving along the upper rim of the frame and in said larger interval, a free length equal to the length of the other intervals between the castellations, and another element identical with the first one and placed in position by engagement of its castellations in the free lengths of the intervals in the first element.

3. A dry battery with a long operational life, comprising groups according to claim 2 stacked upon one another with the cups of successive groups disposed bottom-to-bottom, a conducting wire soldered to the cups on the portions of the peripheries of said cups uncovered by the notches in the frame, another conducting wire soldered to the fingers extending outside the frames, two terminals respectively soldered to the first and second wires and a plastic material sheath surrounding the groups and wires.

References Cited in the file of this patent
UNITED STATES PATENTS

| | | |
|---|---|---|
| 2,521,800 | Martinez et al. | Sept. 12, 1950 |
| 2,663,750 | Paillet | Dec. 22, 1953 |
| 2,671,125 | Heraud | Mar. 2, 1954 |
| 2,713,602 | Shuman | July 19, 1955 |